Feb. 17, 1948.  I. E. WIEGERS  2,436,275
TEMPERATURE CONTROL SYSTEM
Filed July 22, 1943

Irvin E. Wiegers
INVENTOR

Patented Feb. 17, 1948

2,436,275

UNITED STATES PATENT OFFICE 2,436,275

TEMPERATURE CONTROL SYSTEM

Irvin E. Wiegers, Overland, Mo.

Application July 22, 1943, Serial No. 495,964

3 Claims. (Cl. 74—2)

This invention relates to a semi-automatic system of temperature control in which manual operation is combined with automatic operation.

It is the object of the invention to provide a control system which requires no external source of power other than that provided by manual effort and which can be successfully installed by a layman or semi-skilled worker. Another object is to provide thermostatic control low in initial cost and tending to produce economical operation of the heating or cooling unit.

The accompanying drawing illustrates such a mechanism applied to an ordinary domestic heating furnace.

Figures 1, 2:
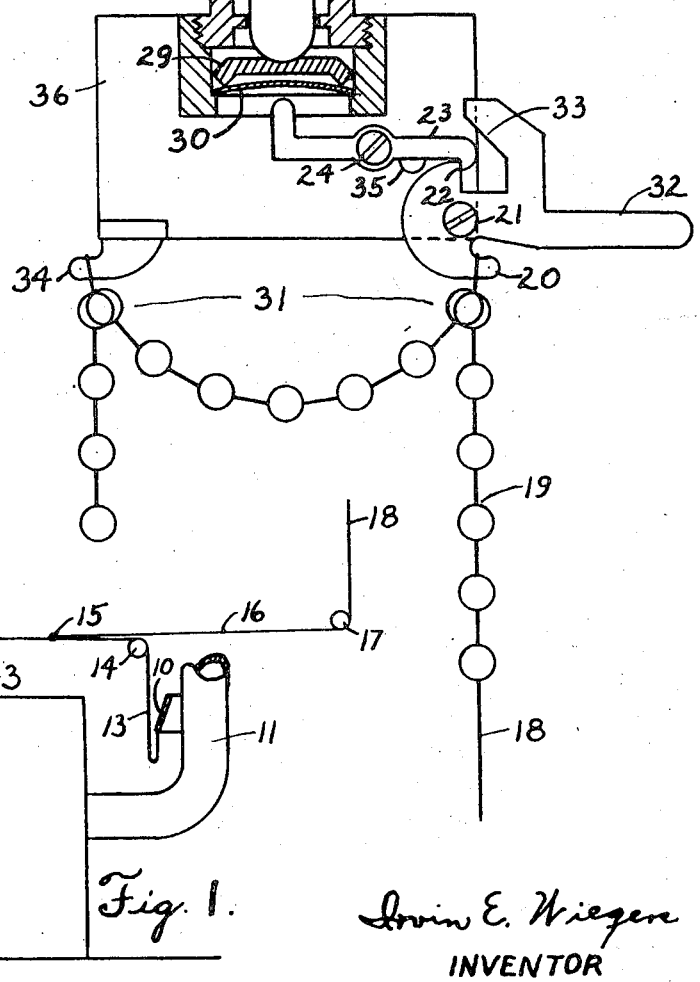
Figure 1 shows a possible draft control arrangement on such a furnace.
Figure 2 shows a thermostat for use with this control system.

The thermostat shown in Figure 2 is preferably installed in the living quarters heated by the furnace in Figure 1. The system illustrated is so arranged that when the temperature at the thermostat reaches the point for which it is set, the rate of combustion in the furnace is retarded by the draft controls.

Figure 1 shows a furnace 3, having a firing door 4, ash removal door 5 with a draft regulator 6, interconnected with flue damper 10 in flue 11 by means of cable 7, 12, 13, which passes through pulleys 9 and 14. Biasing weight 8 is attached to cable 7. Also interconnected at point 15 is the cable 16 passing over pulley 17 to thermostat in Figure 2 by means of cable 18. In Figure 2 cable 18 is secured to open-link chain 19 which is suspended from hook 20. Hook 20 is pivoted on shoulder screw 21 and is held in place by latch 22 engaging pawl 23 which is pivoted on shoulder screw 24.

Yoke 25 is made of material having a smaller coefficient of expansion than that of column 26 which is restrained by adjusting screw 27, operated by calibrated knob 28. The force due to the unequal expansion of yoke 25 and column 26 is transmitted to thrust disc 29 causing snap disc 30 to reverse its concavity when temperature reaches point for which thermostat is set. Snap disc 30 strikes pawl 23 unlatching hook 20 which disengages chain 19 causing draft regulator 6 to close and biasing weight 8 to open damper 10 to the extent permitted by the slack in chain 19 at section 31. This action tends to retard combustion rate in furnace 3.

The use of a snap acting member prevents friction in the latch members or variations in the biasing weight from affecting the temperature response of the thermostatic means, and makes the action more positive.

Thermostat parts are mounted on frame 36.

When the temperature at the thermostat falls below the point for which it is set, the thermostat may be reset by raising hook lever 32 to such an extent that cam 33 causes pawl 23 to deflect snap disc 30 to its upwardly concave position. By this means the effect known as "differential" due to snap action is eliminated. Pawl 23 which is weighted by mass 35 will then engage latch 22. The chain 19 can be used to manually raise the biasing weight 8 and the draft restored to position for increased combustion by engaging chain 19 on hook 20.

The combustion retarding or accelerating action of the control system may be varied by changing the points at which the chain 19 is engaged with the operating hook 20 and the stationary hook 34. I prefer to apply this control system to a heating furnace in such a manner that the rate of combustion is automatically retarded since this makes for maximum economy of fuel but a system can be readily made in such a manner as to increase the rate of combustion automatically. In such a last-named system the coefficient of expansion of the material of column 26 would be less than the coefficient of expansion of the material of yoke 25; the biasing weight 8 would be removed from the cable 7 and applied on the cable 13 and the cable 16 would act in a direction opposite from that shown in Figure 1. There are other uses and applications of this invention which is limited only by the claims.

The fact that manual operation is required is an advantage in a hand fired furnace since it serves as a reminder of the fuel requirements of the furnace and also roughly indicates the rate of combustion.

What I claim as my invention is:

1. A temperature responsive device comprising: temperature responsive means, manually operated means, snap acting means moving in one direction under the influence of the temperature responsive means and moving in the opposite direction under the influence of the manually operated means, latch members arranged to be disengaged by action of the snap acting means moving under the influence of the temperature responsive means.

2. A temperature responsive device comprising: temperature responsive means, manually operated means, snap acting means movable in one direction by the manually operated means and movable in the opposite direction by the temperature responsive means, latch members arranged to be disengaged by the snap acting means when moved by the temperature responsive means.

3. A temperature responsive device comprising temperature responsive means, manually operated means, snap acting means movable in one direction by the manually operated means and movable in the opposite direction by the temperature responsive means, a latch arranged to be opened by action of the snap acting means moving under the influence of the temperature responsive means.

IRVIN E. WIEGERS.

REFERENCES CITED

The following references are of record in the file of this patent:

UNITED STATES PATENTS

| Number | Name | Date |
|---|---|---|
| 511,283 | Tatham | Dec. 19, 1893 |
| 1,116,534 | Baker | Nov. 10, 1914 |
| 1,571,270 | Jensen | Feb. 2, 1926 |
| 1,919,264 | Vaughn | July 25, 1933 |
| 2,028,363 | Timm et al. | Jan. 21, 1936 |
| 2,214,375 | Jackson | Sept. 10, 1940 |
| 2,217,419 | Saul | Oct. 8, 1940 |